(12) United States Patent
Hanna

(10) Patent No.: US 8,924,888 B2
(45) Date of Patent: Dec. 30, 2014

(54) DYNAMIC DATA OBJECT INSERTION

(75) Inventor: Todd Hanna, West Vancouver (CA)

(73) Assignee: SAP France S.A., Paris (FR)

( * ) Notice: Subject to any disclaimer, the term of this patent is extended or adjusted under 35 U.S.C. 154(b) by 1294 days.

(21) Appl. No.: 12/269,889

(22) Filed: Nov. 13, 2008

(65) Prior Publication Data

US 2010/0122192 A1    May 13, 2010

(51) Int. Cl.
  *G06F 3/00* (2006.01)
  *G06T 11/00* (2006.01)

(52) U.S. Cl.
  CPC ..................... *G06T 11/00* (2013.01)
  USPC ............ 715/790; 715/243; 715/247; 715/798

(58) Field of Classification Search
  CPC .............................. G06F 17/211; G06F 3/0481
  USPC .................... 715/790–801, 243, 247
  See application file for complete search history.

(56) References Cited

U.S. PATENT DOCUMENTS

| | | | | |
|---|---|---|---|---|
| 6,707,469 | B1 * | 3/2004 | Kelly | 715/744 |
| 8,095,884 | B2 * | 1/2012 | Karunakaran et al. | 715/768 |
| 8,127,248 | B2 * | 2/2012 | Ording et al. | 715/790 |
| 2003/0103683 | A1 * | 6/2003 | Horie | 382/284 |
| 2004/0003350 | A1 * | 1/2004 | Simmons et al. | 715/517 |
| 2004/0105127 | A1 * | 6/2004 | Cudd et al. | 358/1.18 |
| 2004/0236640 | A1 * | 11/2004 | Kassan | 705/27 |
| 2006/0198555 | A1 * | 9/2006 | Hosotsubo | 382/162 |
| 2006/0206800 | A1 * | 9/2006 | Agrawal et al. | 715/503 |
| 2006/0212803 | A1 * | 9/2006 | Arokiaswamy | 715/520 |
| 2007/0016855 | A1 * | 1/2007 | Masukawa et al. | 715/517 |
| 2007/0074109 | A1 * | 3/2007 | Nagahara et al. | 715/517 |
| 2007/0113175 | A1 * | 5/2007 | Iwasaki | 715/517 |
| 2007/0113198 | A1 * | 5/2007 | Robertson et al. | 715/790 |
| 2007/0162844 | A1 * | 7/2007 | Woodall et al. | 715/517 |
| 2008/0282188 | A1 * | 11/2008 | Hays et al. | 715/788 |
| 2009/0031248 | A1 * | 1/2009 | Kano et al. | 715/790 |
| 2009/0077489 | A1 * | 3/2009 | Homma | 715/788 |
| 2009/0199123 | A1 * | 8/2009 | Albertson et al. | 715/772 |
| 2010/0037219 | A1 * | 2/2010 | Chen et al. | 717/176 |
| 2010/0185681 | A1 * | 7/2010 | Han et al. | 707/802 |

* cited by examiner

*Primary Examiner* — Ryan Pitaro

(57) ABSTRACT

Disclosed is a method and system for inserting a new data object in a data visualization with one or more other data objects already present on a canvas. The insertion of the new data object involves receiving a position of a new data object for the canvas from a user, determining a position of a first one of the one or more data objects and a second one of the one or more data objects on the canvas, determining an overlap pixel count, if the new data object is overlapping with the position of the first one of the one or more data objects, determining an action type on the first one of the one or more data objects based on the overlap pixel count, generating a preview of the canvas with the new data object and inserting the new data object on the canvas based on user approval.

24 Claims, 5 Drawing Sheets

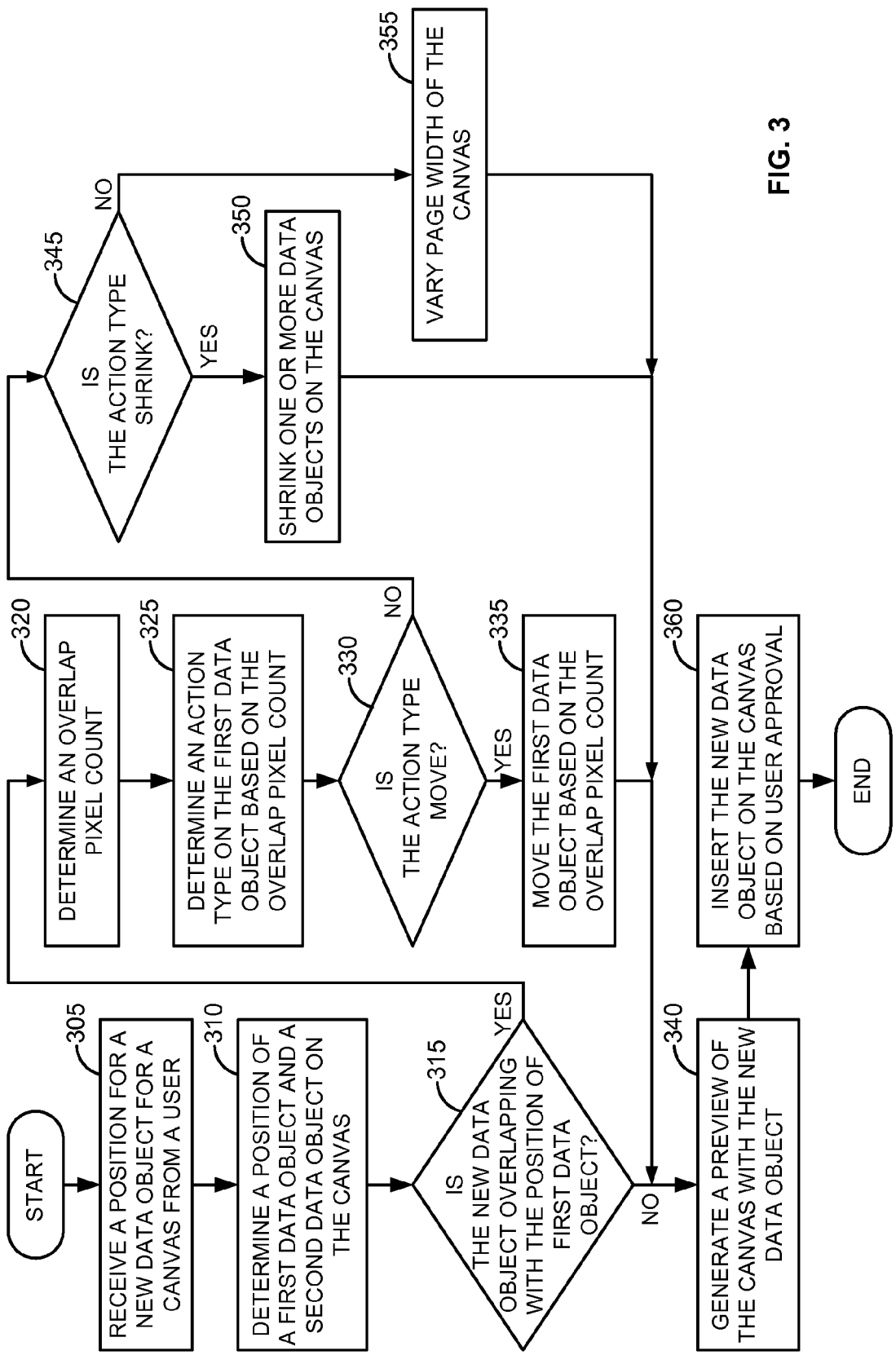

DYNAMIC DATA OBJECT INSERTION

FIELD OF THE INVENTION

The invention relates to data visualization techniques.

BACKGROUND OF THE INVENTION

Business intelligence data presents many challenges to user interface designers trying to find an optimal way for presenting the correct amount of data on limited screen space. By nature, business intelligence data tends to be voluminous not to mention contextual such as to a given user, to a given situation, to a given geography, etc. So many business intelligence tools including reporting tools, such as Crystal Reports by Business Objects, an SAP company provides a flexible platform for creating reports in real time which are accessible to most technology novices including casual business users.

Many reporting tools and other business intelligence applications combine raw data with other data visualization objects such as charts, graphs, etc. Business users want to be able to edit data visualizations dynamically by adding and removing data. However, such users are also very concerned about how the data visualization looks including fitting in the correct type and amount of data in the correct form within given screen limitations. Accordingly, they want to be able to preview how their desired changes will affect a current visualization of the data without actually implementing the change, for instance.

This need is more pronounced on a data visualization that already has data objects (e.g., fields in a report) displayed on an existing canvas. For instance, the current user interface of Crystal Reports requires a lot of manual effort when modifying a report such as by adding a data object into a set area. This effort is commonly referred to as pixel pushing. This experience can be made easier for data visualization authors and increase their productivity simultaneously.

SUMMARY OF THE INVENTION

Disclosed is a method and system for inserting a new data object in a data visualization with one or more other data objects already present on a canvas. The insertion of the new data object involves receiving a position of a new data object for the canvas from a user, determining a position of a first one of the one or more data objects and a second one of the one or more data objects on the canvas, determining an overlap pixel count, if the new data object is overlapping with the position of the first one of the one or more data objects, determining an action type on the first one of the one or more data objects based on the overlap pixel count, generating a preview of the canvas with the new data object and inserting the new data object on the canvas based on user approval.

BRIEF DESCRIPTION OF THE DRAWINGS

A better understanding of embodiments of the invention are illustrated by examples and not by way of limitation, the embodiments can be obtained from the following detailed description in conjunction with the following drawings, in which:

FIG. 3 is a flow diagram describing an exemplary method for inserting a new data object in a data visualization with one or more data objects on a canvas according to an embodiment of the invention.

DETAILED DESCRIPTION

Disclosed is a method and system for inserting a new data object in a data visualization with one or more other data objects already present on a canvas. The insertion of the new data object involves receiving a position of a new data object for the canvas from a user, determining a position of a first one of the one or more data objects and a second one of the one or more data objects already present on the canvas, determining an overlap pixel count, if the new data object is overlapping with the position of the first one of the one or more data objects, determining an action type on the first one of the one or more data objects based on the overlap pixel count, generating a preview of the canvas with the new data object and inserting the new data object on the canvas based on user approval.

Figure 1:
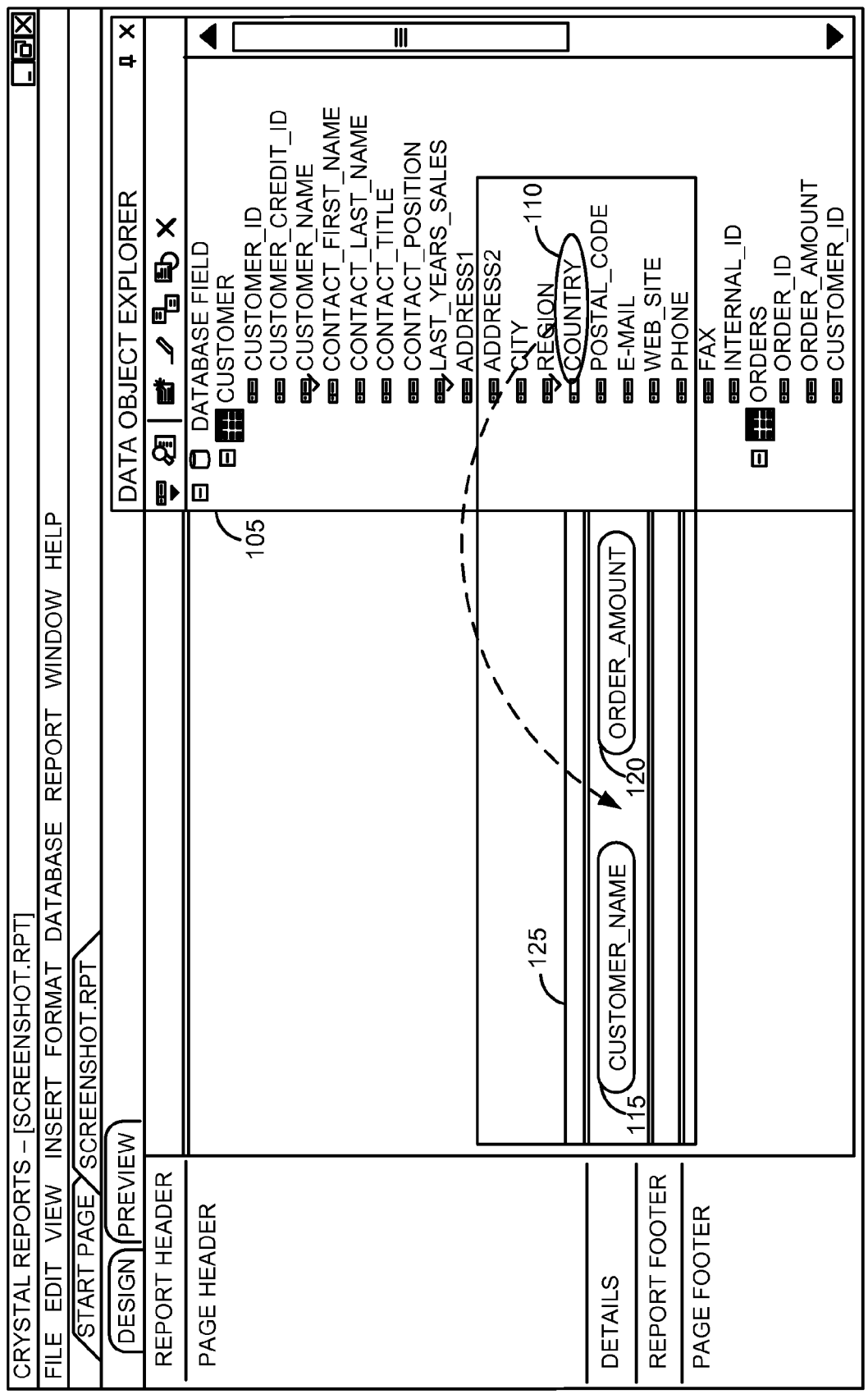
FIG. 1 is an exemplary block diagram of a user interface screen illustrating insertion of a new data object in a data visualization with one or more other data objects already present on a canvas according to an embodiment of the invention.

FIG. 1 is an exemplary block diagram of a user interface screen illustrating insertion of a new data object between a first data object and a second data object according to an embodiment of the invention. Consider an exemplary scenario of a canvas presenting a data visualization having two data objects already present on the canvas. Suppose the data visualization author wants to insert a new data object in between the two previously existing data objects. In existing data visualization applications (e.g., Crystal Reports), the data visualization author would have to manually select one of the data objects (e.g., 115 and 120), move one of the selected data objects an appropriate amount of space and then insert the new data object. A preview is not provided before inserting the data object. Ideally, the user should be able to drag the desired data object to the canvas and the application should take care of the pixel pushing for the user in an intelligent manner.

Suppose the user desires to insert a new data object "country" 110 from a data object explorer 105, for instance, to a canvas 125 between the first data object "customer name" 115 and the second data object "order amount" 120. The process for inserting such a data object in a seamless manner according to at least some embodiments of the invention is described in further detail below. Although many of the examples use a data visualization canvas such as a report canvas and data objects such as report fields to illustrate aspects of the invention described herein, the invention should not be limited by the examples.

Figure 2:
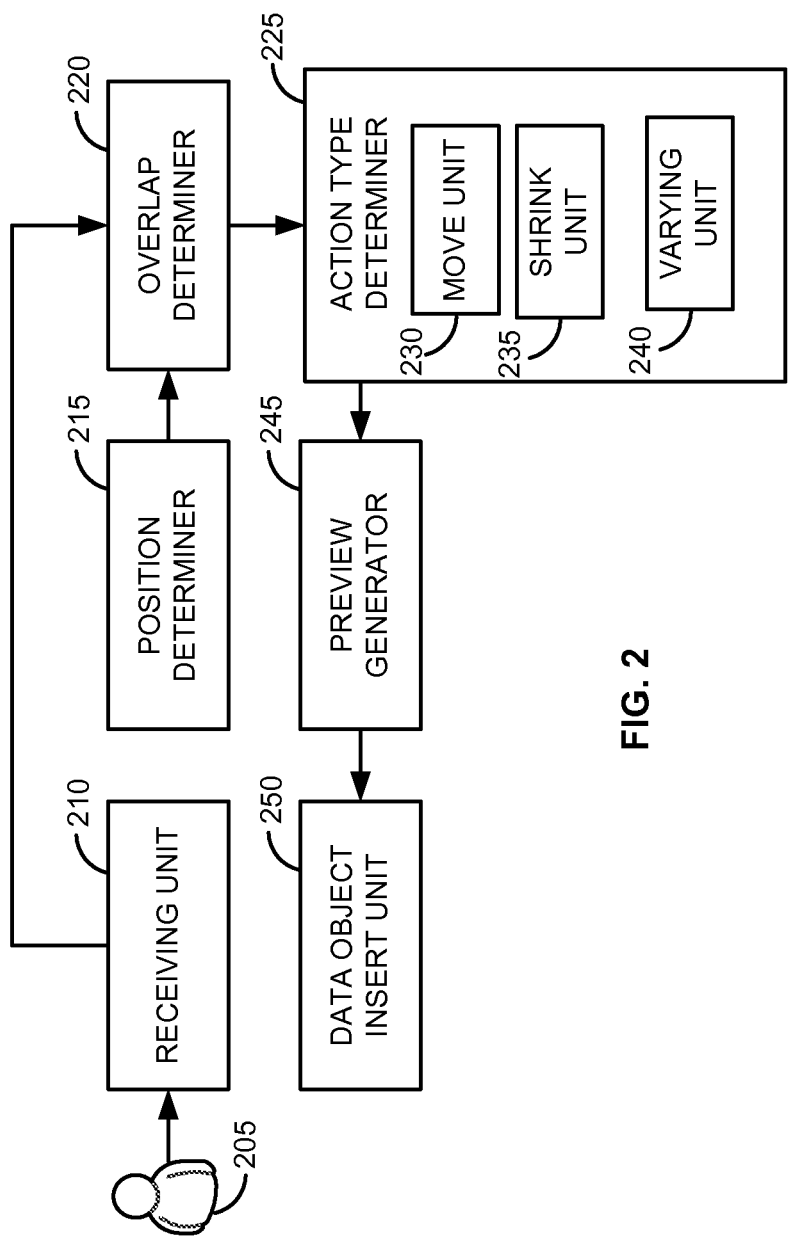
FIG. 2 is a block diagram of an exemplary system for inserting a new data object in a data visualization with one or more data objects on a canvas according to an embodiment of the invention.

FIG. 2 is a block diagram of an exemplary system for inserting a new data object (e.g., 110 of FIG. 1) in a data visualization with one or more data objects (e.g., 115 and 120) on a canvas (e.g., 125) according to an embodiment of the invention. A user 205 specifies a position of a new data object to be inserted to the canvas. A receiving unit 210 receives the positioning data of the new data object from the user 205 including a location of the new data object on the canvas and dimensions of the new data object. The initial dimensions for a data object could be based on a default width of a data object. The defaults could be determined based on data types, for instance. A default font and font size can be applied for all objects and each object type can be designated to be a predetermined number of characters wide by default. For example, by default, a string may be set to be 25 characters wide, an integer may be set to be 5 characters wide, etc. The width of a single character can be set to be the average width of a character of the default font at the default font size. In one embodiment, the default dimensions for a new data object to be inserted or moved onto a canvas can be altered before the move or the addition.

A position determiner 215 determines positioning data of a first data object and a second data object on the canvas including their location on the canvas and their dimensions. An overlap determiner 220 receives the positioning data of the new data object and the positioning data of the first data object and the second data object from the receiving unit 210 and the position determiner 215 respectively. The overlap determiner 220 determines if the position of the new data object is overlapping with at least the position of the first data object. If the overlap determiner 220 finds the position of the new data object overlapping with the position of the first data object an overlap pixel count is determined. The overlap pixel count is a count of the number of pixels of the new data object overlapping with a number of pixels of the first data object. An action type determiner 225 determines a type of action to be performed on the first data object based on the overlap pixel count determined by the overlap determiner 220. The action type determiner 220 further includes a move unit 230, a shrink unit 235 and a varying unit 240. In an embodiment the overlap determiner 220 tracks the dimensions (e.g., height and width) of the new data object.

The overlap determiner 220 determines the new data object overlapping the first data object. In one embodiment, the action type determiner 225 determines to move the first data object to a position away from the original position to create pixel space for the new data object. The move unit 230 of the action type determiner 225 moves the first data object away from the original position. A preview generator 245 generates a preview of the canvas with the new data object.

In another embodiment, the action type determiner 225 determines that there is not enough pixel space created when the first data object is moved away from its original position. In this case, the action type determiner 225 determines to shrink one or more data objects on the canvas to create sufficient pixel space for the new data object using the shrink unit 235. Shrinking one or more data objects can be achieved by varying a font size of one or more data objects on the canvas to create sufficient pixel space for accommodating the new data object. The preview generator 245 generates the preview of the canvas with the new data object accommodated as described above.

Alternatively, if upon the action type determiner 225 determining that there is not enough pixel space created to accommodate the new data object after moving the first data object away from original position using the move unit 230, another solution would be to vary the page width of the canvas using the varying unit 240 to create sufficient pixel space for the new data object. In one embodiment the page width of the canvas is increased by the varying unit 240. A dimension of the canvas (e.g., height and width of the window presenting the data visualization) is increased by the varying unit. Alternatively, either shrinking one or more data objects, including the new data object being added, or varying the page width can be used to accommodate the new data object in one page along with the other data objects existing before such an insertion. Regardless of the chosen method of accommodation, the preview generator 245 generates the preview of the canvas with new data object.

In an embodiment, accommodation of the new data object need not be only by performing a single action type such as moving or shrinking the data objects. The accommodation may be a combination of moving the data objects, shrinking one or more data objects on the canvas and varying the page width of the canvas.

The preview generated is displayed to the user 205. When the user 205 accepts the preview generated, a data object insert unit 250 inserts the new data object on the canvas.

FIG. 3 is a flow diagram describing an exemplary method for inserting a new data object in a data visualization with one or more data objects on a canvas according to an embodiment of the invention. A position of the new data object for the canvas is received from a user at process block 305. A position of a first data object and a second data object on the canvas is determined at process block 310. At decision point 315, if the position of the new data object is overlapping with the position of the first data object the process proceeds to determine an overlap pixel count at process block 320. At process block 325, an action type on the first data object is determined based on the overlap pixel count. At decision point 330, if the action type is moving the process proceeds to process block 335 to move the first data object based on the overlap pixel count. The first data object is moved from its original position based on the overlap pixel count. At process block 340, a preview of the canvas with the new data object is generated. The new data object is inserted on the canvas based on the user approval at process block 360. The user accepts the preview of the canvas when the user is satisfied with the position of the new data object inserted in a data visualization, based on the position of the new data object as specified by the user.

At decision point 330, if the action type is not moving, the process proceeds to decision point 345. At decision point 345, if the action type is shrink, the process proceeds to process block 350 to shrink one or more data objects on the canvas. The shrinking of one or more data objects on the canvas creates sufficient pixel space to accommodate the new data object on the canvas. At decision point 345, if the action type is not shrink, the process proceeds to process block 355 to vary page width of the canvas. Varying the page width of the canvas creates sufficient pixel space to accommodate the new data object on the canvas. At process block 340, a preview of the canvas with the new data object is generated. The new data object is inserted on the canvas based on the user approval at process block 360.

At decision point 315, if the position of the new data object is not overlapping with the position of the first data object, the process proceeds to process block 340 to generate a preview of the canvas with the new data object. The new data object is inserted on the canvas based on the user approval at process block 360.

In one embodiment, the new data object is added to the canvas comprising just one other data object. The new data object is accommodated according to the methods described herein.

In an embodiment, the new data object is inserted between a first and a second data object. A minimum gap pixel count is maintained between the first data object and the second data object.

In yet another embodiment the new data object is inserted on a horizontal pixel axis so that the existing data objects are adjusted along the vertical pixel axis. In yet another embodiment, the new data object is inserted on the vertical pixel axis so that accommodation requires the existing data objects to be adjusted along both vertical and horizontal pixel axis. If pixel space on the horizontal pixel axis of the canvas is insufficient to accommodate the existing data objects and the new data object, preferably, the existing data objects closer to the canvas border are not moved. Instead, the existing data objects not bordering the canvas could be moved to create sufficient pixel space to accommodate the new data object.

FIGS. 4A-4D are an exemplary screen shots for inserting a new data object between a first data object and a second data object according to an embodiment of the invention.

Figure 4A:
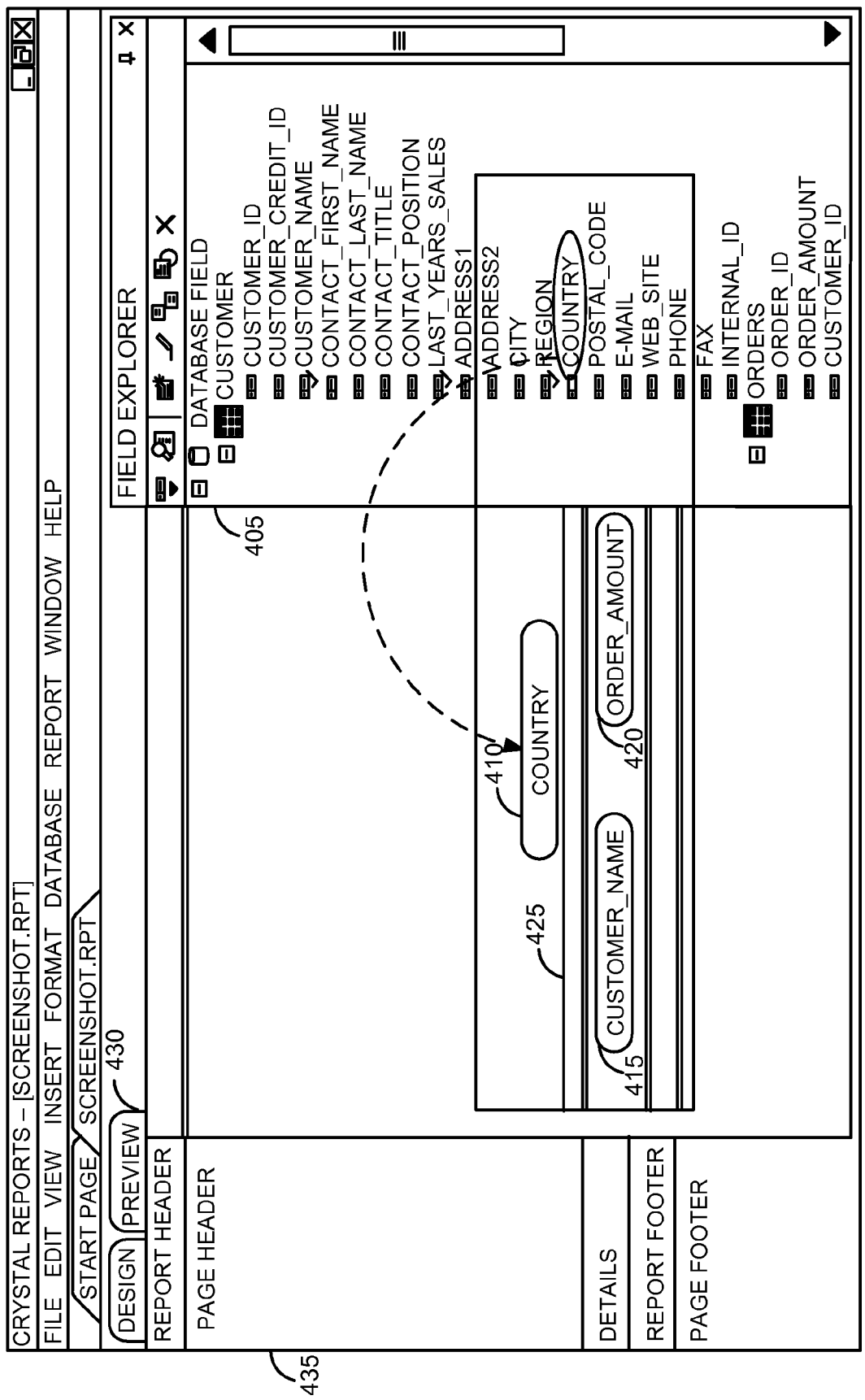
FIGS. 4A-4D are exemplary screens illustrating exemplary methods for inserting a new data object between a first data object and a second data object according to an embodiment of the invention.
Figure 4B:
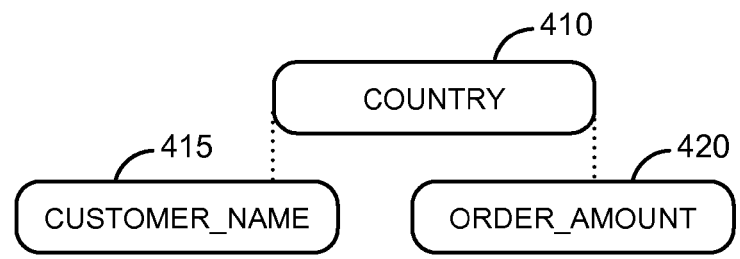

Consider a scenario where the dimensions of the new data object "country" 410 are 30 pixels high and 100 pixels wide. The dimensions of the first data object and the second data object are 30 pixels high and 100 pixels wide. The new data object "country" 410 overlaps the first data object "customer name" 415 by 20 pixels towards the left of the canvas 425 and the second data object "order amount" 420 by 80 pixels towards the right of the canvas 425 as shown in FIGS. 4A and 4B.

Figure 4C:
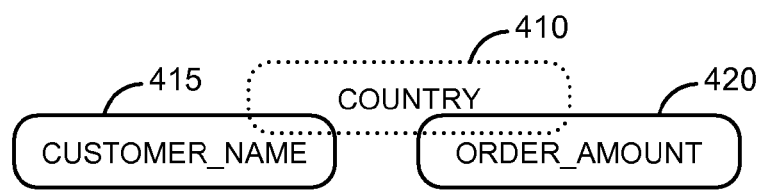

Overlap of the new data object with the first data object "country" 410 and the second data object "order amount" 420 is as shown in FIG. 4C. A minimum gap pixel count of 3 pixels is maintained between the first data object and the second data object.

The overlap pixel count of the new data object "country" 410 with the first data object "customer name" 415 and the second data object "order amount" 420 is calculated based on the dimensions of the new data object.

When moving the first data object and the second data object the minimum gap pixel count of 3 pixels is added to the overlap pixel count, and the first data object and the second data object are moved to corresponding positions. In this scenario, the first data object "customer name" 415 is moved 23 pixels away from its original position towards the left of the canvas 425 and the second data object "order amount" 420 is moved 83 pixels away from its original position towards the right of the canvas 425. Alternatively, the amount of movement of the first and second data objects can be something less than overlap. For instance, the new data object (e.g., 410) being inserted can be made to shrink to allow itself to be accommodated on the canvas. Consider another scenario where there is not enough pixel space created by moving the first data object "customer name" 415 and the second data object "order amount" 420 to insert the new data object. In this scenario, the first data object "customer name" 415 and the second data object "order amount" 420 are shrunk by decreasing the font size.

Also, the accommodation of the new data object (e.g., 410) need not be only by moving the existing data objects (e.g., 415 and 420). The accommodation may be any combination of moving the existing data objects (e.g., 415 and 420), shrinking them, shrinking the new data object (e.g., 410) and varying the page width of the canvas.

Figure 4D:

Moving the first data object "customer name" 415 and the second data object "order amount" 420 happens in real time. A preview is generated as the new data object "country" 410 is moved between the first data object "customer name" 415 and the second data object "order amount" 420. In one embodiment, the preview is viewed by selecting preview tab 430 on the data visualization 435. The new data object "country" 410 is inserted between the first data object "customer name" 415 and "order amount" 420 on the canvas 425 when the user accepts the preview as shown in FIG. 4D.

Consider yet another scenario where there is not enough pixel space created by moving or shrinking the first data object "customer name" 415 and the second data object "order amount" 420 to insert the new data object. In this scenario, a page width of the canvas 425 will be varied to create pixel space for the new data object "country" 410.

Elements of embodiments of the present invention may also be provided as a tangible machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of tangible machine-readable media suitable for storing electronic instructions. For example, the present invention may be downloaded as a computer program which may be transferred from a remote computer (e.g., a server) to a requesting computer (e.g., a client) by way of a communication link (e.g., a modem or network connection).

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. The detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

What is claimed is:

1. A method for inserting a new data object in a data visualization on a canvas comprising one or more data objects, the method comprising:
   receiving a position of the new data object to be inserted on the canvas from a user, wherein the canvas has one or more other data objects already rendered on the canvas;
   determining a position of the one or more other data objects on the canvas;
   determining that the new data object to be inserted is overlapping with the position of the one or more other data objects on the canvas;
   determining an overlap pixel count, wherein the overlap pixel count represents an amount of overlapping pixels between the new data object and the one or more other data objects;
   determining an action type on the one or more other data objects based on the overlap pixel count comprising:
      moving the one or more other data objects by the overlap pixel count;
      determining that moving the one or more other data objects by the overlap pixel count moves the one or more other data objects beyond the canvas dimensions; and
      shrinking the one or more other data objects on the canvas; and
   upon user approval, inserting the new data object on the canvas according to the determined action type.

2. The method of claim 1, wherein the determined action type comprises moving the one or more other data objects by at least the overlap pixel count.

3. The method of claim 1, wherein the determined action type comprises shrinking the one or more other data objects on the canvas.

4. The method of claim 3, wherein shrinking one or more other data objects and inserting the new data object on the canvas further comprises varying a font size of the one or more other data objects on the canvas.

5. The method of claim 1, wherein the determined action type comprises varying a page width of the canvas.

6. The method of claim 1, wherein determining an action type on the one or more other data objects based on the overlap pixel count further comprises:
   determining that shrinking the one or more other data objects on the canvas moves the one or more other data objects beyond the canvas dimensions; and
   varying a page width of the canvas.

7. The method of claim 1, wherein receiving the position of the new data object for the canvas comprises receiving the dimensions of the new data object based on a default dimensions setting of a data type associated with the new data object.

8. The method of claim 1, wherein determining the overlap pixel count of the new data object with the one or more other data objects comprises tracking dimensions of the new data object.

9. The method of claim 1, wherein inserting the new data object on the canvas according to the determined action type includes adding a minimum gap pixel count to the overlap pixel count.

10. The method of claim 1, wherein inserting the new data object comprises inserting the new data object on a horizontal pixel axis.

11. The method of claim 1, wherein inserting the new data object comprises inserting the new data object on a vertical pixel axis.

12. The method of claim 1, further comprising generating a preview of the canvas with the new data object prior to inserting the new data object on the canvas based on user approval on the preview.

13. A computer system including a processor and a memory, the memory comprising instructions that are executable by the processor, the computer system comprising:
   a receive unit to receive a position of a new data object to be added to a canvas comprising one or more other data objects;
   a position determiner to determine a position of the one or more other data objects on the canvas;
   an overlap determiner in communication with the receive unit and the position determiner to determine that the new data object is overlapping with the position of the one or more other data objects and to determine an overlap pixel count, wherein the overlap pixel count represents an amount of overlapping pixels between the new data object and the one or more other data objects;
   an action type determiner in communication with the overlap determiner to determine an action type to insert the new data object on the canvas, the action type being selected based at least on the overlap pixel count comprising:
      moving the one or more other data objects by the overlap pixel count;
      determining that moving the one or more other data objects by the overlap pixel count moves the one or more other data objects beyond the canvas dimensions;
      shrinking the one or more other data objects on the canvas;
      determining that shrinking the one or more other data objects on the canvas moves the one or more other data objects beyond the canvas dimensions; and
      varying a page width of the canvas; and
   a data object insert unit to insert the new data object on the canvas according to the determined action type.

14. The computer system of claim 13, wherein the overlap determiner further tracks dimensions of the new data object.

15. The computer system of claim 13, wherein the action determiner comprises a move unit to move the one or more other data object by the overlap pixel count.

16. The computer system of claim 13, wherein an action determiner comprises a shrink unit to shrink font size of one or more other data objects on the canvas.

17. The computer system of claim 13, wherein the action determiner comprises a varying unit to vary a page width of the canvas.

18. The computer system of claim 13, further comprising a preview generator in communication with the action type unit for generating a preview of the canvas with the new data object.

19. An article of manufacture, comprising:
   a non-transient storage medium comprising machine readable instructions for receiving a position of a new field to be added to a report canvas comprising one or more other fields;
   determining a position of the one or more other fields on the canvas;
   determining that a user indicated position of the new field is overlapping with the positions of the other fields;
   determining an overlap pixel count representative of an amount of overlapping pixels between the new field and at least one of the other fields;
   determining an action type on the at least one of the other fields based on the overlap pixel count comprising:
      moving the one or more data objects by the overlap pixel count;
      determining that moving the one or more data objects by the overlap pixel count moves the one or more data objects beyond the canvas dimensions; and
      shrinking the one or more data objects on the canvas; and
   upon user approval, inserting the new field on the canvas according to the determined action type.

20. The article of manufacture in claim 19, further comprising instructions for tracking dimension of the new field.

21. The article of manufacture in claim 19, further comprising instructions for adding a minimum gap amount of pixels to the amount of the overlap.

22. The article of manufacture in claim 19, wherein the action type selected for inserting the new field is selected from a group consisting of moving at least one of the other fields, shrinking at least one of the other fields and changing the page width of the report canvas.

23. The article of manufacture in claim 19, further comprising instructions for shrinking the new field based at least on the amount of overlap.

24. The article of manufacture in claim 19, further comprising instructions for generating a preview of the new field on the canvas prior to inserting the new field based on user approval of the preview.

* * * * *